United States Patent Office 3,340,268
Patented Sept. 5, 1967

3,340,268
1-[PIPERIDYL]-2,2-DI(MONOCYCLIC HEXACYCLIC ARYL)-CYCLOPROPANE
Renat Herbert Mizzoni, Long Valley, N.J., assignor to Ciba Corporation, New York, N.Y., a corporation of Delaware
No Drawing. Filed Feb. 26, 1964, Ser. No. 347,377
6 Claims. (Cl. 260—293.4)

The present invention relates to cyclopropane compounds, more especially to 1-[Pi-($C_nH_{2n}$)]-2,2-di-(monocyclic hexacyclic aryl)-cyclopropane compounds, in which Pi is a piperidyl group, and the letter $n$ is one of the integers 0, 1, 2 or 3, and in which one of the ortho-positions of one monocyclic hexacylic aryl group is linked with one of the ortho-positions of the other monocyclic hexacyclic aryl group through a radical of the formula —(A)$_m$—, in which A is a divalent radical, and the letter $m$ stands for 0 or 1, salts thereof, N-oxides thereof, salts of N-oxides thereof, and quaternary compounds thereof, as well as process for the preparation of such compounds.

A piperidyl radical representing the group Pi is a 2-piperidyl radical, a 3-piperidyl radical or a 4-piperidyl radical, in which the ring nitrogen atom and/or any of the ring-carbon atoms are unsubstituted or substituted. Substituents are organic radicals, for example, aliphatic radicals, such as lower alkyl, lower alkenyl and the like, cycloaliphatic radicals, such as cycloalkyl and the like, cycloaliphatic-aliphatic radicals, such as cycloalkyl-lower alkyl and the like, carbocyclic aryl radicals, such as monocyclic carbocyclic aryl, carbocyclic aryl-aliphatic radicals, such as monocyclic carbocyclic aryl-lower alkyl and the like, or any other suitable substituents. These radicals are represented, for example, by lower alkyl, e.g. methyl, ethyl, propyl, isopropyl, butyl, isobutyl, secondary butyl, pentyl, neopentyl and the like, as well as lower alkenyl, e.g. allyl, methylallyl and the like, cycloalkyl having from three to eight, preferably from five to seven, ring carbon atoms, e.g. cyclopropyl, cyclopentyl, cyclohexyl and the like, cycloalkyl-lower alkyl, in which cycloalkyl has from three to eight, preferably from five to seven, ring carbon atoms, e.g. cyclopropylmethyl, cyclopentylmethyl, cyclohexylmethyl, 2-cyclohexylethyl and the like, monocyclic carbocyclic aryl, e.g. phenyl and the like, monocyclic carbocyclic aryl-lower alkyl, such as phenyl-lower alkyl, e.g. benzyl, 1-phenylethyl, 2-phenylethyl and the like, or any other suitable substituent. They have preferably from one to ten carbon atoms, and can also have additional groups as substituents; lower alkyl, e.g. methyl, ethyl, isopropyl and the like, hydroxyl, etherified hydroxyl, such as lower alkoxy, e.g. methoxy, ethoxy and the like, esterified hydroxyl, such as halogeno, e.g. chloro, bromo and the like, mercapto, etherified mercapto, such as lower alkyl-mercapto, e.g. methyl-mercapto, ethyl-mercapto, amino groups, such as amino, as well as N-monosubstituted amino, e.g. N-lower alkyl-amino and the like, or N,N-disubstituted amino, e.g. N,N-di-lower alkyl-amino, N,N-alkylene-imino, in which alkylene has from four to seven carbon atoms, 4-substituted piperazino, for example, 4-lower alkyl-piperazino and the like, may serve as such additional substituents.

As mentioned above, the letter $n$ stands for one of the integers 0, 1, 2 or 3. The group of the formula —($C_nH_{2n}$)— represents, therefore, either a direct bond between the piperidyl portion Pi and the cyclopropane ring, or an alkylene radical having at most three carbon atoms. Such alkylene radicals are, for example, methylene, 1,1-ethylene, 1,2-ethylene, 1,3-propylene and the like.

Monocyclic hexacyclic aryl groups are above all monocyclic carbocyclic hexacyclic aryl groups, i.e. phenyl groups. These groups are unsubstituted or substituted by one or more than one of the same or of different substituents attached to any of the positions available for substitution. The latter are, for example, lower alkyl, e.g. methyl, ethyl, n-propyl, isopropyl, n-butyl and the like, etherified hydroxyl, particularly lower alkoxy, e.g. methoxy, ethoxy, n-propyloxy, isopropyloxy, n-butyloxy and the like, esterified hydroxyl, particularly halogeno (representing hydroxyl esterified with a hydrohalic acid), e.g. fluoro, chloro, bromo and the like, trifluoromethyl, etherified mercapto, particularly lower alkylmercapto, e.g. methylmercapto, ethylmercapto and the like, acyl, particularly lower alkanoyl, e.g. acetyl, propionyl and the like, or any other analogous substituent. Monocyclic hexacyclic aryl groups are especially phenyl, (lower alkyl)-phenyl, (etherified hydroxyl)-phenyl, especially (lower alkoxy)-phenyl, (esterified hydroxyl)-phenyl, especially (halogeno)-phenyl, (trifluoromethyl) - phenyl, (etherified mercapto)-phenyl, especially (lower alkyl-mercapto)-phenyl, (acyl)-phenyl, especially (lower alkanoyl)-phenyl and the like. Although both monocyclic hexacyclic aryl portions may be substituted, only one of these groups is usually substituted, preferably by one substituent only, which is advantageously attached to one of the positions having no adjacent substituted carbon atoms.

A divalent radical A connecting one of the ortho-positions of one monocyclic hexacyclic aryl group with one of the ortho-positions of the other monocyclic hexacyclic aryl group is the thio radical of the formula —S—, as well as the sulfinyl radical of the formula —SO—, the sulfonyl radical of the formula —$SO_2$—, or the oxy radical of the formula —O—; it may also be a divalent lower aliphatic radical, having preferably from one to two carbon atoms and at most one double bond, as represented by a methylene radical, having preferably the formula —$CH_2$—, or, more particularly, a 1,2-ethylene radical, having preferably the formula —$CH_2CH_2$— or a 1,2-ethenylene radical, having preferably the formula —CH=CH—.

Apart from the two monocyclic hexacyclic aryl groups substituting the 2-position and the group Pi substituting the 1-position of the cyclopropane portions, the latter is unsubstituted or may be substituted, preferably by aliphatic groups, such as lower alkyl, e.g. methyl, ethyl, n-propyl, isopropyl and the like, as well as by aromatic groups, e.g. phenyl and the like.

Salts of the compounds of this invention are acid addition salts, such as the pharmaceutically acceptable, non-toxic acid addition salts, for example, those with inorganic acids, e.g. hydrochloric, hydrobromic, sulfuric, phosphoric, nitric acids and the like, or with organic acids, such as organic carboxylic acids, e.g. acetic, propionic, pivalic, glycolic, lactic, succinic, methyl-succinic, maleic, malic, tartaric, citric, benzoic, salicylic, 4-aminosalicyclic, 2-phenoxy-benzoic, 2-acetoxybenzoic, nicotinic, isonicotinic acid and the like, or with organic sulfonic acids, methane sulfonic, ethane sulfonic, ethane 1-2-disulfonic, 2-hydroxyethane sulfonic, p-toluene sulfonic, naphthalene 2-sulfonic acid and the like. Acid addition salts may also serve as intermediates, for example, for the manufacture of other acid addition salts, or the purification of the free compounds, as well as for identification and characterization purposes. Salts primarily prepared for the latter are, for example, those with acidic organic nitro compounds, e.g. picric, picrolonic, flavianic acid and the like, metal complex acids, e.g. phosphotungstic, phosphomolybdic, chloroplatinic, Reinecke acid and the like, or any other equivalent acids.

Also included within the scope of this present invention are the N-oxides of the compounds of this invention, as well as acid addition salts of such N-oxides.

Quaternary derivatives of the compounds of this invention are those formed with the reactive esters of alcohols and strong acids. They are represented primarily by lower alkyl, e.g. methyl, ethyl, n-propyl, isopropyl and the like, or phenyl-lower alkyl, e.g. benzyl, 1-phenylethyl, 2-phenylethyl and the like, quaternary salts, such as halides, e.g. chloride, bromide, iodide and the like, sulfates or sulfonates, such as lower alkane sulfonates, e.g. methane sulfonate, ethane sulfonate and the like, hydroxy-lower alkane sulfonates, e.g. 2-hydroxy-ethane sulfonate and the like, monocyclic carbocyclic aryl sulfonates, e.g. p-toluene sulfonate and the like, or any other reactive ester of an alcohol. Also included as quaternary compounds are the corresponding quaternary hydroxides, and the salts of such hydroxides with acids other than hydrohalic, sulfuric or sulfonic acids.

The compounds of this invention may be in the form of mixtures of isomers, such as racemates, or of the single isomers, such as the optically active antipodes.

The compounds of this invention are more especially those of the formula

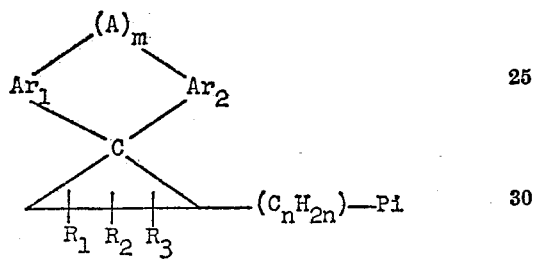

in which Pi and the letters $m$ and $n$ have the previously given meaning, and in which each of the groups $Ar_1$ and $Ar_2$ is a monocyclic hexacyclic 1,2-arylene radical, A represents a divalent radical, especially thio of the formula —S—, as well as sulfinyl of the formula —SO—, sulfonyl of the formula —SO$_2$—, oxy of the formula —O—, or a divalent aliphatic radical, having preferably from one to two carbon atoms and at most one double bond, each of the groups $R_1$, $R_2$ and $R_3$ is hydrogen, an aliphatic group or an aromatic group, salts thereof, N-oxides thereof, salts of N-oxides thereof, or quaternary compounds thereof.

The compounds of this invention have pharmacological activities and are useful as pharmacological agents; in general, they affect the functioning of the central nervous system. They are useful as spasmolytics.

Particularly useful are the compounds of the formula

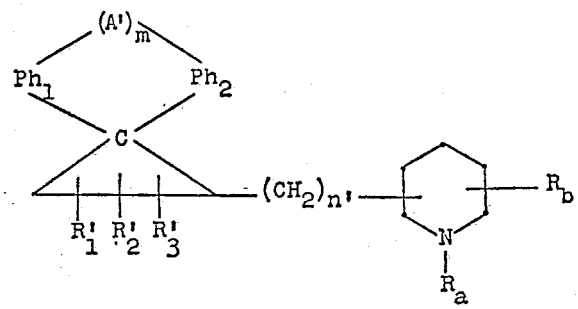

in which the letter $m$ has the previously given meaning, and in which each of the groups $Ph_1$ and $Ph_2$ is 1,2-phenylene, (lower alkyl)-1,2-phenylene, (lower alkoxy)-1,2-phenylene, (halogeno)-1,2-phenylene, (trifluoromethyl)-1,2-phenylene, (lower alkyl-mercapto)-1,2-phenylene or (lower alkanoyl)-1,2-phenylene, A' is thio, sulfonyl, oxy, or 1,2-ethylene, each of the groups $R'_1$, $R'_2$ and $R'_3$ is hydrogen or lower alkyl, the letter $n'$ is one of the integers 0 or 1, the group $R_a$ is hydrogen, lower alkyl, hydroxy-lower alkyl, lower alkoxy-lower alkyl, halogeno-lower alkyl, N-lower alkyl amino-lower alkyl, N,N-di-lower alkyl-amino-lower alkyl, or phenyl-lower alkyl, and the group $R_b$ is hydrogen or lower alkyl, or acid addition salts, particularly pharmaceutically acceptable acid addition salts, thereof. In the above compounds, at most one of the two 1,2-phenylene radicals is usually substituted, preferably by only one of the indicated substituents, which is advantageously attached to one of the positions having no neighboring substituents.

The compounds of this invention are above all represented by those of the formulae

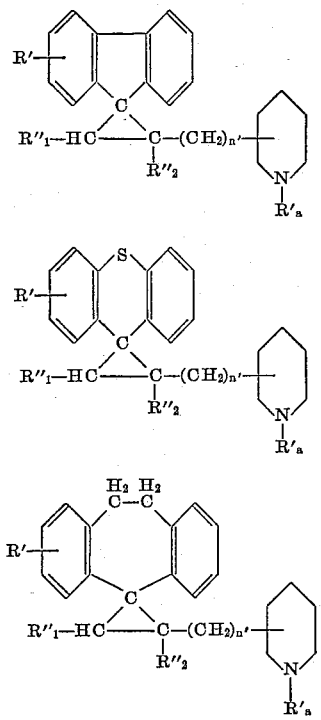

in which the letter $n'$ has the previously given meaning, and in which R' is hydrogen, lower alkyl, lower alkoxy, halogeno, trifluoromethyl, lower alkyl-mercapto or lower alkanoyl, each of the groups $R''_1$ and $R''_2$ is hydrogen or methyl, and $R'_a$ is hydrogen or lower alkyl, or acid addition salts, particularly pharmaceutically acceptable acid addition salts, thereof.

The compounds of this invention are useful in the form of compositions suitable for enteral, e.g. oral, or parenteral use, consisting essentially of a pharmacologically effective amount of one of the new compounds of this invention in admixture with a pharmaceutically acceptable, organic or inorganic, solid or liquid carrier, which usually represents the major portion by weight of such compositions. These preparations are in solid form, for example, as capsules, tablets, dragées and the like, or in liquid form, for example, as solutions, suspensions, emulsions and the like. Suitable carrier materials are, for example, starches, e.g. corn starch, wheat starch, rice starch and the like, sugars, e.g. lactose, sucrose and the like, stearic acid or salts thereof, e.g. magnesium stearate, calcium stearate and the like, stearyl alcohol, talc, gums, acacia, tragacanth, polyalkylene glycols, propylene glycol and the like. The quantity and the nature of the carrier ingredients may vary widely and depend, inter alia, upon the desired physical appearance or size of the composition, method of manufacture and the like. Encapsulation may be effected by using, if desired, the same excipients as those used for tablets. If necessary, the compositions having as the effective pharmacological ingredient one of the compounds of this invention, may contain other auxiliary substances, such as preserving, stabilizing, wetting, emulsifying agents and the like, salts for varying the osmotic pressure, buffers, etc. They may also contain, in combination, other useful substances. The compounding of the formulations is generally carried out in the manner normally employed in the art, i.e. by manufacturing a mixture, a granulate and the like. Any compatible color, approved and certified under the provisions of the Federal Food, Drug and Cosmetic Law may be used for aesthetic purposes or as a means of identification.

The compounds of this invention are prepared according to known methods, for example, by converting in a 1-[Py-($C_nH_{2n}$)] - 2,2 - di - (monocyclic hexacyclic aryl)-cyclopropane compound, in which the letter $n$ has the previously given meaning, and Py is a pyridyl group, and in which one of the ortho-positions of one monocyclic hexacyclic aryl group is linked with one of the ortho-positions of the other monocyclic hexacyclic aryl group through a radical of the formula —$(A)_m$—, A and the letter $m$ having the previously given meaning, or a derivative thereof, the pyridyl portion Py into the piperidyl group Pi, and, if desired, replacing in a resulting compound, in which the ring nitrogen of the piperidyl group carries a hydrogen, the latter by an organic radical, and/or, if desired, converting a resulting salt into the free compound or another salt, and/or, if desired, converting a resulting compound into an N-oxide or a quaternary compound thereof, and/or, if desired, converting a resulting compound or an N-oxide into a salt thereof, and/or, if desired, converting a resulting quaternary compound into another quaternary compound, and/or, if desired, separating a mixture of isomers into the single isomers.

The conversion of the pyridyl group Py, which is a 2-pyridyl, a 3-pyridyl or a 4-pyridyl group, in which the ring-carbon atoms are otherwise unsubstituted or substituted as shown before, is carried out according to known methods. For example, the starting materials or acid addition salts thereof are converted into the desired compounds of this invention by treatment with catalytically activated hydrogen using a catalyst having a metal of the eighth group of the Periodic System, particularly platinum oxide and the like. Preferably, a greater than the usual amount of the catalyst is used, and the reduction reaction is carried out in the presence of acetic acid, which may be diluted with another solvent, if necessary, at an elevated temperature, and/or, in a closed vessel under increased pressure. The pyridine starting materials, particularly those in which the linking divalent radical A is devoid of any sulfur, are also converted into the desired piperidine compounds of this invention by treatment with an alkali metal, especially sodium, in the presence of a lower alkanol, e.g. methanol, ethanol, n-propanol, isopropanol, n-butanol and the like, or with a suitable hydride reducing reagent, such as lithium aluminum hydride, in the presence of a suitable diluent, e.g. tetrahydrofuran, diethyl ether and the like; these reactions are preferably carried out at an elevated temperature, if necessary, in the atmosphere of an inert gas.

The preferred method of converting the pyridine compounds into the desired piperidine compounds of this invention comprises using an appropriate derivative thereof as the starting material. Especially suitable are the quaternary compounds of the pyridine starting materials, as well as the N-oxides thereof and the like. These derivatives are converted into the desired compounds of this invention by reduction.

A quaternary derivative of the pyridine starting material is particularly the quaternary compound with a reactive ester of an aliphatic alcohol, particularly the reactive ester formed by an alcohol of the formula $R_a$—OH, in which $R_a$ has the previously given meaning, and a suitable acid, such as a strong mineral acid, especially a hydrohalic acid, e.g. hydrochloric, hydrobromic or hydriodic acid, as well as sulfuric acid and the like, or a strong organic sulfonic acid, e.g. methane sulfonic, ethane sulfonic, 2-hydroxyethane sulfonic, p-toluene sulfonic acid and the like. The preferred reactive esters of aliphatic alcohols are the halides of aliphatic nature, especially the compounds of the formula $R_a$—Hal, in which $R_a$ has the previously given meaning, and Hal is halogeno having preferably an atomic weight greater than 19. The preferred starting materials used in the above procedure are, therefore, the 1-[Py-$C_nH_{2n}$)]-2,2-di-(monocyclic hexacyclic aryl)-cyclopropane quaternary compounds, especially the halides thereof.

The conversion of these derivatives of the pyridine starting materials into the desired compounds of this invention is achieved according to known methods. Preferably, these starting materials are treated with hydrogen in the presence of a suitable catalyst containing a metal of the eighth group of the Periodic System, e.g. platinum oxide and the like; the catalytic reduction is performed in the presence of a solvent or solvent mixture, if necessary, at an elevated temperature, and/or, in a closed vessel under increased pressure.

Reduction of the quaternary derivatives of the pyridine starting materials, especially those in which the linking divalent radical A is devoid of any sulfur, to form the desired piperidine compounds of this invention is also achieved by treating these starting materials with a suitable hydride reducing reagent, particularly an alkali metal aluminum hydride, e.g. lithium aluminum hydride, sodium aluminum hydride and the like, as well as magnesium aluminum hydride or any other equivalent hydride reagent. These reagents are used in the presence of a suitable solvent, e.g. tetrahydrofuran, diethyl ether and the like, or solvent mixture, if necessary, at an elevated temperature, and/or, in the presence of a suitable activator, e.g. aluminum chloride and the like. The reduction of a quaternary derivative of the pyridine starting material to form a piperidyl compound may also be carried out by treatment with an alkali metal, e.g. sodium and the like, in the presence of a lower alkanol, e.g. methanol, ethanol, n-propanol, n-butanol and the like, if necessary, at an elevated temperature, and/or, in the atmosphere of an inert gas, e.g. nitrogen.

Other derivatives of the starting material, particularly N-oxides thereof, are converted into the desired piperidyl compounds of this invention according to the previously mentioned methods.

The pyridine starting materials used in the above procedure are new and are intended to be included within the scope of the present invention. They are represented by the following formula

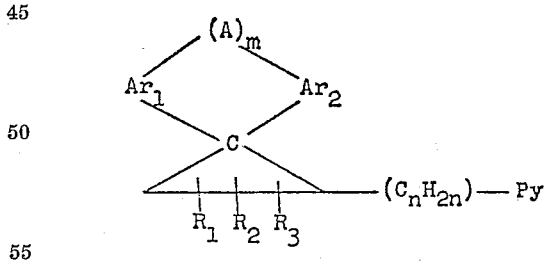

in which $Ar_1$, $Ar_2$, A, Py, $R_1$, $R_2$, $R_3$, and the letters $m$ and $n$ have the previously given meaning, and also include derivatives thereof, particularly the salts thereof, the quaternary compounds thereof and the N-oxides thereof. Especially useful are the compounds of the formula

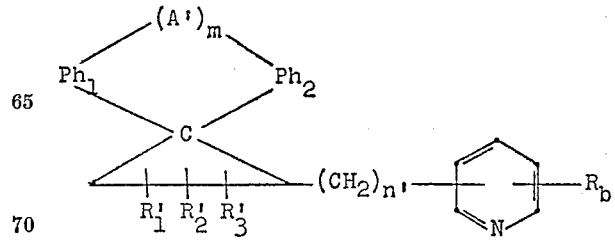

in which $Ph_1$, $Ph_2$, $A'$, $R_b$, $R'_1$, $R'_2$, $R'_3$, and the letters $m$ and $n$ have the previously given meaning, and derivatives thereof, particularly the quaternary compounds thereof with reactive esters of alcohols of the formula $R_{aa}$—OH, especially with compounds of the formula $R_a$—Hal, in which Hal has the previously given meaning, and $R_{aa}$ is one of the organic radicals represented by $R_a$, as well as the acid addition salts thereof and the N-oxides thereof. These compounds are represented by those of the formulae

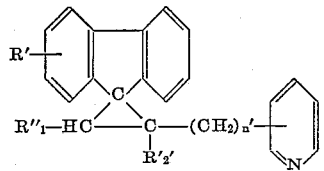

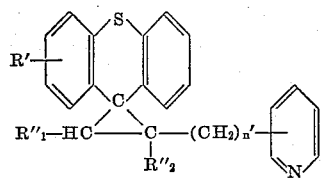

and

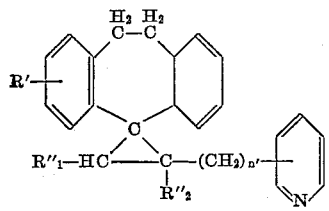

in which R', R''$_1$, R''$_2$ and the letter $n'$ have the previously given meaning, and derivatives thereof, particularly the quaternary compounds thereof with reactive esters of alcohols of the formula $R'_{aa}$—OH, especially with compounds of the formula $R'_{aa}$—Hal, in which Hal has the previously given meaning, and $R'_{aa}$ is lower alkyl, as well as their acid addition salts or N-oxides.

The above starting materials are prepared, for example, by reacting a di-(monocyclic hexacyclic aryl)-diazomethane, in which one of the ortho-positions of one monocyclic hexacyclic aryl group is linked with one of the ortho-positions of the other monocyclic hexacyclic aryl group through a radical of the formula —$(A)_n$—, in which A and the letter $n$ have the previously given meaning, with an alkenyl-pyridine compound, and, if desired, converting a resulting compound into a derivative thereof, such as a salt, a quaternary compound or an N-oxide thereof.

The above reaction is carried out according to known methods, for example, by bringing into contact with each other the diazomethane compound and the alkenyl-pyridine compound, usually in the presence of a solvent, e.g. benzene and the like, or a solvent mixture, and, if necessary, while cooling or at an elevated temperature. The alkenyl-pyridine compounds are represented by the formula $R_1$—$(R_3)C$=$C(R_2)$—$(C_nH_{2n})$—Py, in which Py, $R_1$, $R_2$, $R_3$ and the letter $n$ have the previously given meaning; preferred reagents are those of the formula

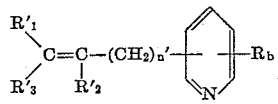

in which $R_b$, $R'_1$, $R'_2$, $R'_3$ and the letter $n'$ have the previously given meaning, especially those of the formula

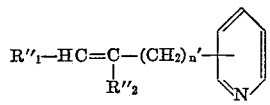

in which R''$_1$, R''$_2$ and the letter $n'$ have the previously given meaning.

The diazomethane intermediates used in the above preparation of the starting materials are prepared, for example, by converting in a di-(monocyclic hexacyclic aryl)-ketone or a di-(monocyclic hexacyclic aryl)-thioketone, in which one of the ortho-positions of one monocyclic hexacyclic aryl group is linked with one of the ortho-positions of the other monocyclic hexacyclic aryl group through a radical of the formula —$(A)_n$—, in which A and the letter $n$ have the previously given meaning, the oxo or thiono group into a hydrazono group (for example, by treatment with hydrazine hydrate), and oxidizing the resulting hydrazone of the di-(monocyclic hexacyclic aryl)-ketone (for example, by treatment with mercuric oxide in the presence of a suitable base, e.g. potassium hydroxide and the like) to form the desired di-(monocyclic hexacyclic aryl)-diazomethane intermediate.

In a compound resulting from the procedure of this invention, in which the ring-nitrogen of the piperidyl portion carries a hydrogen, such hydrogen can be replaced by an organic radical, especially an organic radical having aliphatic characteristics, for example, an aliphatic radical, such as lower alkyl or substituted lower alkyl and the like, as well as a cycloaliphatic radical, a cycloaliphatic-aliphatic radical, or a carbocyclic arylaliphatic radical, especially phenyl-lower alkyl, or any other suitable organic radical having aliphatic characteristics. Replacement of hydrogen by such groups is carried out according to known methods; for example, N-methylation may be carried out by treatment with formaldehyde and formic acid.

More generally, replacement of hydrogen by an organic radical is achieved by reacting the N-unsubstituted piperidine compound with the reactive ester of an alcohol of aliphatic characteristics, especially an aliphatic alcohol, such as a lower alkanol or a substituted lower alkanol, as well as a cycloaliphatic alcohol, a cycloaliphatic-aliphatic alcohol, or a carbocyclic aryl-aliphatic alcohol, such as a phenyl-lower alkanol or any other suitable alcohol having aliphatic characteristics. A reactive ester of such alcohol is especially an ester formed with a strong inorganic acid, particularly a hydrohalic acid, e.g. hydrochloric, hydrobromic, hydriodic acid and the like, as well as sulfuric acid and the like, or a strong organic sulfonic acid, e.g. methane sulfonic, ethane sulfonic, 2-hydroxy-ethane sulfonic, benzene sulfonic, p-toluene sulfonic acid and the like. Especially suitable are the halides of aliphatic characteristics, particularly the lower alkyl halides or substituted lower alkyl halides, or the di-lower alkyl sulfates and the like.

They are reacted with the N-unsubstituted piperidyl compound, preferably a salt thereof, such as an alkali metal, e.g. sodium potassium and the like, salt thereof (which may be prepared prior to the reaction, for example, by treating the starting material with a suitable salt-forming reagent, such as an alkali metal hydride or an alkali metal amide in the presence of an inert solvent, or in situ, for example, by carrying out the reaction in the presence of an alkali metal carbonate, benzyl trimethyl ammonium hydroxide, or any other suitable salt-forming and/or acid neutralizing reagent), and, if necessary, in the presence of a suitable solvent or solvent mixture, while cooling or at an elevated temperature, and/or, in the atmosphere of an inert gas, e.g. nitrogen.

A resulting acid addition salt may be converted into the free compound according to known methods, for example, by treating it with a base, such as a metal hydroxide, for example, an alkali metal or alkaline earth metal hydroxide, e.g. lithium hydroxide, sodium hydroxide, potassium hydroxide, calcium hydroxide and the like, a metal carbonate, such as an alkali metal or an alkaline earth metal carbonate or hydrogen carbonate, e.g. sodium, potassium or calcium carbonate or hydrogen carbonate and the like, ammonia and the like, or with a hydroxyl ion exchange preparation, or with any other suitable reagent.

A resulting acid addition salt may also be converted into another acid addition salt according to known methods, for example, by treating a salt with an inorganic acid with a metal, e.g. sodium, barium, silver and the like, salt of an acid in a solvent or solvent mixture, in which a resulting inorganic salt is insoluble and is thus removed from the reaction medium. An acid addition salt may also be converted into another acid addition salt by treatment with an anion exchange preparation.

A free compound may be converted into an acid addition salt according to known method, for example, by reacting the base, preferably a solution thereof in a solvent or solvent mixture, with the appropriate acid or a solution thereof, or with an anion exchange preparation and isolating the desired salt, which may be obtained in the form of a hydrate or may contain solvent of crystallization.

N-oxides of the compounds of this invention are prepared, for example, by treatment of the free compounds with an N-oxidizing reagent, particularly a per-acid, e.g. perbenzoic, per-acetic acid and the like, as well as hydrogen peroxide, ozone and the like, in the presence of a suitable solvent, especially a halogenated aliphatic hydrocarbon, e.g. chloroform, methylene chloride and the like, or solvent mixture. N-oxides may form acid addition salts, for example, according to the above described procedure.

A compound of this invention is converted into a quaternary ammonium derivative, for example, by reacting it with a reactive ester formed by a hydroxylated compound and a strong acid. Reactive esters are primarily those yielding lower alkyl or phenyl-lower alkyl quaternary ammonium salts, such as halides, sulfates or sulfonates. The quaternizing reaction may be performed in the absence or presence of a suitable, inert solvent, while cooling, at room temperature or at an elevated temperature, under atmospheric or increased pressure, and/or in the atmosphere of an inert gas, e.g. nitrogen.

A resulting quaternary ammonium compound may be converted into another quaternary ammonium compound, such as a quaternary ammonium hydroxide, for example, by reacting a quaternary ammonium halide with a silver oxide, or a quaternary ammonium sulfate with barium hydroxide, by treating a quaternary ammonium salt with an anion exchange prepration, by electrodialysis or any other suitable procedure. From a resulting quaternary ammonium hydroxide there may be prepared other quaternary ammonium salts with acids, such as those mentioned for the preparation of the acid addition salts, or with mono-lower alkyl sulfates, e.g. methyl sulfate, ethyl sulfate and the like. A quaternary ammonium compound may also be converted directly into another quaternary ammonium salt without the formation of the quaternary ammonium hydroxide; for example, a quaternary ammonium iodide may be reacted with freshly prepared silver chloride or with hydrochloric acid in anhydrous methanol to yield the corresponding quaternary ammonium chloride. A quaternary ammonium salt may also be converted into another quaternary ammonium salt by treatment with an anion exchange preparation. Quaternary ammonium derivatives may also be obtained in the form of the hydrates or may contain solvent of crystallization.

The new compounds of this invention may be obtained in the form of mixtures of isomers, which may be separated into the individual isomers according to known methods. Thus, racemates of compounds of this invention may be resolved into the optically active d- and l-forms according to known resolution procedures, for example, by reacting the free base of a d,l-compound, preferably a solution thereof, with one of the optically active forms of an acid containing an asymmetric carbon atom. Especially useful as optically active forms of salt-forming acids having an asymmetric carbon atom are D-tartaric acid (also known as l-tartaric acid) and L-tartaric acid (also known as d-tartaric acid); the optically active forms of malic, mandelic, camphor 10-sulfonic, quinic acid or any other suitable acid, may also be employed. A resulting mixture of salts is separated into the single salts on the basis of physico-chemical differences, such as different solubilities, for example, by fractional crystallization. A resulting salt may be converted into the free and optically active base or into another salt, and an optically active base may be converted into an acid addition salt, an N-oxide, an acid addition salt of an N-oxide or a quaternary ammonium compound according to previously described known procedures. The optically active forms may also be isolated by biochemical methods.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon.

EXAMPLE 1

A solution of 7.6 g. of 2-(4-pyridyl)-spiro[cyclopropane-1,9'-fluorene] in 200 ml. of ethanol and 3.8 ml. of a 4.7 N solution of hydrogen chloride in ethanol is treated with hydrogen under an initial presure of about 3½ atmospheres and in the presence of 1.0 g. of platinum oxide as the catalyst. After the uptake of the theoretical amount of hydrogen, the reaction is interrupted, the reaction mixture is filtered, and the filtrate is concentrated to a small volume under reduced pressure. The resulting precipitate is filtered off and washed with diethyl ether; the resulting 2 - (4 - piperidyl) - spiro[cyclopropane-1,9'-fluorene] hydrochloride of the formula

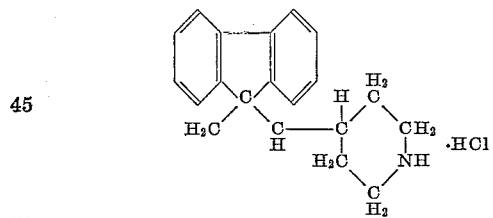

melts at 268–272° after two recrystallizations from anhydrous ethanol; yield: 3.1 g.

Upon treatment of the above 2-(4-piperidyl)-spiro[cyclopropane-1,9'-fluorene] hydrochloride in water with an aqueous solution of sodium hydroxide, the free 2-(4-piperidyl)-spiro[cyclopropane-1,9'-fluorene] is formed; it is isolated by extracting it with methylene chloride, and is characterized by converting it into the 2-(4-piperidyl)-spiro[cyclopropane-1,9'-fluorene] picrate by treatment with picric acid.

The starting material used in the above procedure is prepared as follows: A suspension of 65.2 g. of 9-hydrazono-fluorene, 150 g. of mercuric oxide and 37.2 g. of anhydrous sodium sulfate in 500 ml. of anhydrous diethyl ether is stirred while adding dropwise 9.8 ml. of a saturated solution of potassium hydroxide in ethanol over a period of five minutes. The reaction mixture is stirred for twenty minutes and is then filtered. The residue is washed with anhydrous diethyl ether, and the combined filtrates are evaporated to dryness under reduced pressure. The resulting 9-diazo-fluorene is recrystallized from petroleum ether, M.P. 95° (with decomposition).

A solution of 22.6 g. of 9-diazo-fluorene and 15.5 g. of 4-vinyl-pyridine in 200 ml. of benzene is allowed to stand at room temperature for six days. The resulting precipitate is filtered off and recrystallized from a mixture of methanol and ethanol to yield the 2-(4-pyridyl)-spiro[cyclopropane-1,9'-fluorene] of the formula

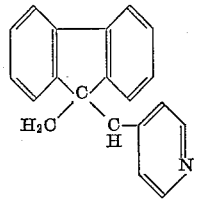

which melts at 204–206°. An additional amount of the desired starting material is obtained by evaporating the benzene filtrate and recrystallizing the residue as indicated above; total yield: 12.7 g.

EXAMPLE 2

A mixture of 27.1 g. of 2-(2-pyridyl)-spiro[cyclopropane-1,9'-fluorene] methiodide and 1.0 g. of platinum oxide in 250 ml. of anhydrous ethanol is treated with hydrogen at an initial pressure of about 3.5 atmospheres and while maintaining the temperature at 40°. After the uptake of the theoretical amount of hydrogen, the reaction is interrupted, the catalyst is filtered off and the filtrate is evaporated to dryness under reduced pressure. The gummy residue is triturated with diethyl ether, and the desired 2 - (1 - methyl - 2 - piperidyl) - spiro[cyclopropane - 1,9'-fluorene] hydriodide of the formula

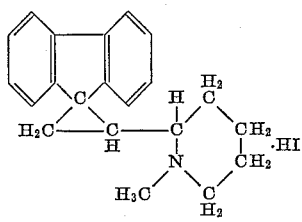

is purified by two recrystallizations from a mixture of isopropanol and diethyl ether; its hemihydrate melts at 117°; yield: 14.5 g.

The starting material used in the above procedure is prepared as follows: A mixture of 23.6 g. of 9-diazofluorene and 16.2 g. of 2-vinyl-pyridine in 200 ml. of benzene is allowed to stand at room temperature for seven days, and is then evaporated to dryness. The residue is dissolved in carbon tetrachloride; the organic solution is washed three times with water, dried and concentrated to dryness to yield the 2-(2-pyridyl)-spiro[cyclopropane-1,9'-fluorene] of the formula

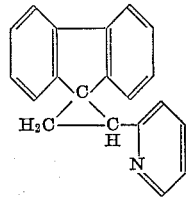

which is used without further purification.

The above material is dissolved in 100 ml. of ethanol, and 21.6 g. of methyl iodide is added. The reaction mixture is refluxed for two hours and is then concentrated to dryness. The resulting 2-(2-pyridyl)-spiro[cyclopropane-1,9'-fluorene] methiodide of the formula

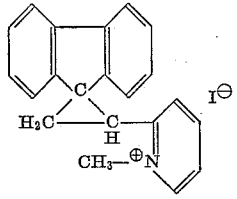

is purified by recrystallization from anhydrous ethanol, M.P. 213°; yield: 36.9 g.

EXAMPLE 3

A solution of 3.8 g. of 2-(2-pyridyl)-spiro[cyclopropane-1,9'-fluorene] in 100 ml. of ethanol containing 1.9 ml. of a 4.7 N solution of hydrogen chloride in ethanol is treated with hydrogen under an initial pressure of about 3.5 atmospheres in the presence of 0.5 g. of platinum oxide as the catalyst. After the uptake of the theoretical amount of hydrogen, the reaction is interrupted, the reaction mixture is filtered and the filtrate is concentrated to dryness. The resulting 2-(2-piperidyl)-spiro[cyclopropane-1,9'-fluorene] hydrochloride of the formula

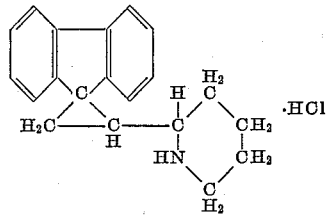

is purified by recrystallization from a mixture of ethanol and diethyl ether.

The starting material used in the above procedure is prepared as follows: A mixture of 4.8 g. of 9-diazofluorene and 5.4 g. of 2-vinyl-pyridine in 33 ml. of benzene is allowed to stand at room temperature for five days. The solvent is removed under reduced pressure; the residue is dissolved in methylene chloride and the organic solution is washed three times with water and dried. Upon evaporating the solution, the 2-(2-pyridyl)-spiro[cyclopropane-1,9'-fluorene] of the formula

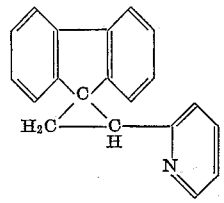

is obtained. The methylene chloride solution, when treated with gaseous hydrogen chloride and diluted with diethyl ether, yields the 2-(2-pyridyl)-spiro[cyclopropane-1,9'-fluorene] hydrochloride, which melts at 294–295° after recrystallization from isopropanol; yield: 3.7 g.

EXAMPLE 4

A total of 4.5 g. of 2-(2-pyridyl)-spiro[cyclopropane-1,9'-thioxanthene] methiodide is dissolved in 100 ml. of tetrahydrofuran and the solution is placed into a Soxhlet extraction apparatus and is reacted with 3.0 g. of lithium aluminum hydride. The reaction is maintained for forty-eight hours, and the resulting reaction mixture is treated with 3 ml. of ethyl acetate, 9 ml. of water, 6 ml. of a 20 percent aqueous solution of sodium hydroxide and 12 ml. of water. The mixture is then filtered, and the filtrate is evaporated under reduced pressure. The residue is taken up in methylene chloride; the organic solution is washed with water, dried and diluted with diethyl ether. Upon treating it with gaseous dry hydrogen chloride, the desired 2-(1-methyl - 2 - piperidyl)-spiro[cyclopropane-1,9'-thioxanthene]hydrochloride of the formula

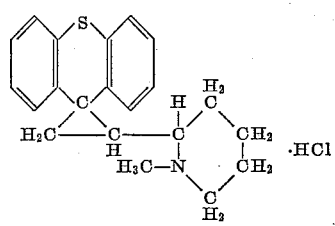

precipitates and is purified by recrystallization from a mixture of ethanol and diethyl ether.

The starting material used in the above procedure is prepared as follows: A mixture of 58.5 g. of thioxanthen-9-one and 100 g. of oxalyl chloride is refluxed for twenty hours and is then concentrated to dryness. The residue is dissolved in 500 ml. of benzene, and the solution is treated with 100 g. of thioacetic acid of the formula $CH_3-CO-SH$. The mixture is stirred and refluxed for five hours; the precipitate is filtered off and combined with a second crop obtained by concentrating the filtrate to dryness. The resulting thioxanthen-9-thione is purified by recrystallization from a mixture of benzene and cyclohexane, M.P. 179°; yield: 52.7 g.

A suspension of 52.7 g. of thioxanthen-9-thione in 100 ml. of benzene and 100 ml. of anhydrous ethanol is heated to reflux while stirring, and is then treated with a solution of 11.6 g. of hydrazine hydrate (100 percent) in 263 ml. of ethanol. A total of 11.6 ml. of water is added and the mixture is refluxed for six hours. The desired 9-hydrazono-thioxanthene precipitates upon cooling and is filtered off; it melts at 80–83° after recrystallization from isopropanol and decolorization with a charcoal preparation; yield: 26.7 g.

A suspension of 26.7 g. of 9-hydrazono-thioxanthene, 112 g. of mercuric oxide and 27.6 g. of sodium sulfate in 500 ml. of anhydrous diethyl ether is treated with 6.5 ml. of a saturated solution of potassium hydroxide in methanol. After stirring at room temperature for six hours, the reaction mixture is filtered, the solid material is washed with diethyl ether, and the combined filtrates are concentrated under reduced pressure without heating. The desired 9-diazo-thioxanthene melts at 96° after recrystallization from petroleum ether; yield: 23.3 g.

A solution of 11.4 g. of 9-diazo-thioxanthene and 4.8 g. 2-vinyl-pyridine in 100 ml. of benzene is allowed to stand at room temperature for three days. The solvent is removed under reduced pressure, and the residue representing the 2-(2-pyridyl)-spiro[cyclopropane-1,9' - thioxanthene] of the formula

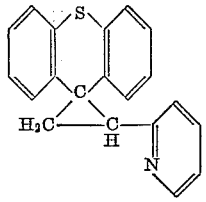

is dissolved in 250 ml. of anhydrous ethanol, and is then refluxed for twelve hours in the presence of 6.22 g. of methyl iodide. The resulting crystalline 2-(2-pyridyl)-spiro[cyclopropane-1,9'-thioxanthene] methiodide of the formula

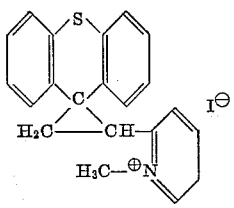

is obtained on evaporating the reaction mixture to dryness; it melts as the monohydrate at 140° after recrystallization from a mixture of isopropanol and diethyl ether; yield: 4.5 g.

EXAMPLE 5

A solution of 4.7 g. of 2-(4-pyridyl)-spiro[cyclopropane-1,9'-thioxanthene] ethiodide in 100 ml. of tetrahydrofuran is placed into a Soxhlet apparatus and reduced with 3.0 g. of lithium aluminum hydride as described in Example 4 to yield the 2-(1-ethyl-4-piperidyl)-spiro[cyclopropane-1,9'-thioxanthene] of the formula

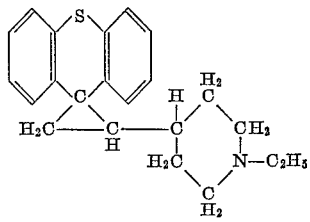

which is isolated in the form of its hydrochloride salt.

The starting material used in the above procedure is prepared as follows: A solution of 11.4 g. of 9-diazo-thioxanthene and 4.8 g. of 4-vinyl-pyridine in 100 ml. of benzene is allowed to stand for three days at room temperature and is then evaporated to dryness. The residue is dissolved in methylene chloride; the organic solution is gassed with dry hydrogen chloride, and the resulting 2-(4-pyridyl)-spiro[cyclopropane-1,9' - thioxanthene] hydrochloride of the formula

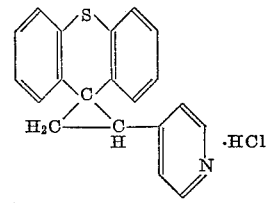

is filtered off and recrystallized from a mixture of chloroform and ethyl methyl ketone, M.P. 200–205°; yield: 7.0 g.

A mixture of the above salt in water is treated with an aqueous solution of sodium hydroxide; the 2-(4-pyridyl)-spiro[cyclopropane-1,9'-thioxanthene] is extracted with methylene chloride and obtained by evaporating the dry organic solution. It is dissolved in anhydrous ethanol and refluxed in the presence of an excess of ethyl iodide. The desired 2-(4-pyridyl)-spiro[cyclopropane-1,9' - thioxanthene] ethiodide of the formula

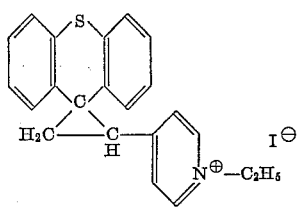

is isolated by evaporating the reaction mixture and recrystallizing the residue.

EXAMPLE 6

A mixture of 8.7 g. of 2-(4-pyridyl)-spiro[cyclopropane-1,9'-fluorene] methiodide and 1.0 g. of platinum oxide in 150 ml. of anhydrous ethanol is treated with hydrogen at an initial pressure of about 3.5 atmospheres and a temperataure of 40°. The reaction is carried out as described in Example 2 to yield the 2-(1-methyl-4-piperidyl)-spiro[cyclopropane-1,9'-fluorene] hydriodide of the formula

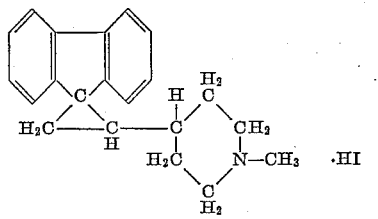

which is purified by recrystallization from a mixture of diethyl ether and isopropanol.

The free 2-(1-methyl-4-piperidyl)-spiro[cyclopropane-1,9'-fluorene], obtained from its hydriodide by treatment with an aqueous solution of sodium hydroxide, and extraction with methylene chloride, when reacted with hydrogen peroxide, yields the 2-(1-methyl-4-piperidyl)-spiro[cyclopropane-1,9′-fluorene] N-oxide, which is converted into its hydrochloride by reacting a solution thereof with gaseous hydrogen chloride.

The 2-(1-methyl-4-piperidyl)-spiro[cyclopropane-1,9′-fluorene] methiodide is obtained by treating a solution of the 2-(1-methyl-4-piperidyl)-spiro[cyclopropane-1,9′-fluorene] in ethanol or acetone with an excess of methyl iodide.

The starting material used in the above procedure is prepared as follows: A solution of 2-(4-pyridyl)-spiro[cyclopropane-1,9′-fluorene] and 9 ml. of methyl iodide in 100 ml. of methanol and 100 ml. of ethanol is refluxed for fourteen hours and is then evaporated to dryness. The resulting 2-(4-pyridyl)-spiro[cyclopropane-1,9′-fluorene] methiodide of the formula

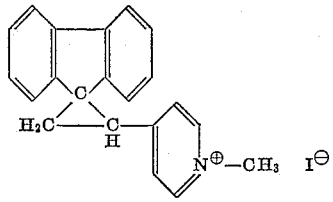

is purified by recrystallization from ethanol, M.P. 215°; yield: 5.9 g.

EXAMPLE 7

A mixture of 3.2 g. of 2-(4-piperidyl)-spiro[cyclopropane-1,9′-fluorene], 1.5 g. of a 37 percent aqueous solution of formaldehyde and 1.5 g. of formic acid (98–100%) is refluxed for six hours. The excess of the reagents is removed under reduced pressure, and the residue is taken up in water. The mixture is made basic with a concentrated solution of sodium hydroxide and is then extracted with methylene chloride. The organic extract is dried and gassed with dry hydrogen chloride and the desired 2-(1-methyl-4-piperidyl)-spiro[cyclopropane-1,9′-fluorene] hydrochloride is precipitated by adding diethyl ether and purified by recrystallization.

EXAMPLE 8

A mixture of 2.75 g. of 2-(4-piperidyl)-spiro[cyclopropane-1,9′-fluorene] and 1.5 g. of sodium carbonate in 150 ml. of ethanol is refluxed for four hours and is then treated with 1.2 g. of 2-N,N-dimethylaminoethyl chloride. After refluxing for an additional two days, the reaction mixture is allowed to stand overnight, the inorganic material is filtered off, and the filtrate is evaporated under reduced pressure. The resulting 2-[1-(2-N,N-dimethylaminoethyl)-4-piperidyl]-spiro[cyclopropane-1,9′-fluorene] of the formula

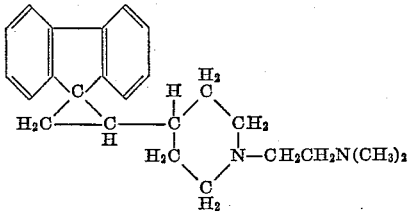

is converted into the dihydrochloride by treating a solution of the free compound in methylene chloride with dry gaseous hydrogen chloride.

EXAMPLE 9

The following compounds are prepared according to the previously-described procedure using the appropriate intermediates and starting materials:

2′-chloro-2-(1-methyl-4-piperidyl)-spiro[cyclopropane-1,9′-fluorene], prepared by reacting 2-chloro-9-diazo-fluorene with 4-vinyl-pyridine, treating the resulting 2′-chloro-2-(4-pyridyl)-spiro[cyclopropane-1,9′-fluorene] with methyl iodide, and reducing the 2′-chloro-2-(4-pyridyl)-spiro[cyclopropane-1,9′-fluorene] methiodide with lithium aluminum hydride;

3-methyl-2-(1-benzyl-4-piperidyl)-spiro[cyclopropane-1,9′-fluorene], prepared by reacting the 9-diazo-fluorene with 4-(1-propenyl)-pyridine, treating the resulting 3-methyl-2-(4-pyridyl)-spiro[cyclopropane-1,9′-fluorene] with benzyl bromide, and reducing the quaternary 3-methyl-2-(4-pyridyl)-spiro[cyclopropane-1,9′-fluorene] benzyl bromide with hydrogen in the presence of platinum oxide;

2-(1-methyl-2-piperidylmethyl)-spiro[cyclopropane-1,9′-fluorene], prepared by reacting 9-diazo-fluorene with 2-allyl-pyridine, treating the resulting 2-(2-pyridylmethyl)-spiro[cyclopropane-1,9′-fluorene] with methyl iodide, and reducing the 2-(2-pyridylmethyl)-spiro[cyclopropane-1,9′-fluorene] methiodide with hydrogen in the presence of platinum oxide;

2-(1-methyl-4-piperidylmethyl)-spiro[cyclopropane-1,9′-fluorene], prepared by reacting 9-diazo-fluorene with 4-allyl-pyridine, treating the resulting 2-(4-pyridylmethyl)-spiro[cyclopropane-1,9′-fluorene] with methyl iodide, and reducing the 2-(4-pyridylmethyl)-spiro[cyclopropane-1,9′-fluorene] methiodide with hydrogen in the presence of platinum oxide;

2-[1-(2-methoxyethyl)-4-piperidyl]-spiro[cyclopropane-1,9′-fluorene], prepared by reacting 2-(4-piperidyl)-spiro[cyclopropane-1,9′-fluorene] with 2-methoxyethyl chloride in the presence of potassium carbonate;

2-(1-methyl-4-piperidyl)-2-methyl-spiro[cyclopropane-1,9′-thioxanthene], prepared by reacting 9-diazo-thioxanthene with 4-(1-methyl-vinyl)-pyridine, reacting the resulting 2-methyl-2-(4-pyridyl)-spiro[cyclopropane-1,9′-thioxanthene] with methyl iodide, and reducing the 2-methyl-2-(4-pyridyl)-spiro[cyclopropane-1,9′-thioxanthene] methiodide with lithium aluminum hydride;

3′-methoxy-2-(2-piperidyl)-spiro[cyclopropane-1,9′-thioxanthene], prepared by reacting the 9-diazo-3-methoxy-thioxanthene with 2-vinyl-pyridine, and reducing the resulting 3′-methoxy-2-(2-pyridyl)-spiro[cyclopropane-1,9′-thioxanthene] with hydrogen in the presence of platinum oxide and acetic acid;

2′-methylmercapto-2-(1-methyl-4-piperidyl)-spiro[cyclopropane-1,9′-thioxanthene], prepared by reacting 9-diazo-2-methylmercapto-thioxanthene with 4-vinyl-pyridine, reacting the resulting 2′-methylmercapto-2-(4-pyridyl)-spiro[cyclopropane-1,9′-thioxanthene] with methyl iodide, and reducing the resulting 2′-methylmercapto-2-(4-pyridyl)-spiro[cyclopropane-1,9′-thioxanthene] methiodide with hydrogen in the presence of platinum oxide;

2-(1-methyl-2-piperidyl)-2′-trifluoromethyl-spiro[cyclopropane-1,9′-thioxanthene], prepared by reacting 9-diazo-2-trifluoromethyl-thioxanthene with 2-vinyl-pyridine, reacting the resulting 2-(2-pyridyl)-2′-trifluoromethyl-spiro[cyclopropane-1,9′-thioxanthene] with methyl iodide, and reducing the resulting 2-(2-pyridyl)-2′-trifluoromethyl-spiro[cyclopropane-1,9′-thioxanthene]methiodide with hydrogen in the presence of platinum oxide;

2′-chloro-2-(1-methyl-4-piperidyl)-spiro[cyclopropane-1,9′-thioxanthene], prepared by reacting 2-chloro-9-diazo-thioxanthene with 4-vinyl-pyridine, reacting the resulting 2′-chloro-2-(4-pyridyl)-spiro[cyclopropane-1,9′-thioxanthene] with methyl iodide, and reducing the 2′-chloro-2-(4-pyridyl)-spiro[cyclopropane-1,9′-thioxanthene] methiodide with lithium aluminum hydride;

2′-methyl-2-(1-ethyl-4-piperidyl)-spiro[cyclopropane-1,9′-thioxanthene], by reacting 9-diazo-2-methyl-thioxanthene with 4-vinyl-pyridine, treating the resulting 2′-methyl-2-(4-pyridyl)-spiro[cyclopropane-1,9′-thioxanthene] with ethyl bromide, and reducing the 2′-methyl-2-(4-pyridyl)-spiro[cyclopropane-1,9′-thioxanthene] ethobromide with lithium aluminum hydride;

2-[1-(2-N,N-dimethylaminoethyl)-2-piperidyl]-spiro[cyclopropane-1,9′-thioxanthene], prepared by reacting 9-diazo-thioxanthene with 2-vinyl-pyridine, reducing the resulting 2-(2-pyridyl)-spiro[cyclopropane-1,9' - thioxanthene] with hydrogen in the presence of platinum oxide and acetic acid, and reacting the resulting 2-(2-piperidyl)-spiro[cyclopropane - 1,9' - thioxanthene] with 2-N,N-dimethylaminoethyl chloride in the presence of potassium carbonate;

2-{1-[2-(4-methyl-1-piperazino)-ethyl] - 4 - piperidyl}-spiro[cyclopropane-1,9'-thioxanthene], prepared by reacting 9-diazo-thioxanthene with 4-vinyl-pyridine, reducing the resulting 2-(4-pyridyl)-spiro[cyclopropane-1,9' - thioxanthene] with hydrogen in the presence of platinum oxide and acetic acid, and reacting the 2-(4-piperidyl)-spiro[cyclopropane-1,9'-thioxanthene] with sodium amide and then with 2-(4-methyl-1-piperazino)-ethyl chloride;

2-(1-methyl-2-piperidyl)-spiro[cyclopropane - 1,9'-xanthene], prepared by reacting 9-diazo-xanthene with 2-vinyl-pyridine, reacting the resulting 2-(2-pyridyl)-spiro[cyclopropane-1,9'-xanthene] with methyl iodide, and reducing the resulting 2-(2-pyridyl)-spiro[cyclopropane-1,9'-xanthene] methiodide by treatment with lithium aluminum hydride;

2-(4-piperidyl)-spiro[cyclopropane - 1,5'-10',11'-dihydro-5'H-dibenzo[a,d]cycloheptene], prepared by reacting 5-diazo-10,11-dihydro-5H-dibenzo[a,d]cycloheptene with 4-vinyl-pyridine, and reducing the resulting 2-(4-pyridyl)-spiro[cyclopropane - 1,5'-10',11' - dihydro - 5'H-dibenzo[a,d]cycloheptene] by treatment with hydrogen in the presence of platinum oxide;

3'-chloro-2-(1-methyl - 2 - piperidyl) - spiro[cyclopropane-1,5'-10',11' - dihydro - 5'H - dibenzo[a,d]cycloheptene], prepared by reacting 3-chloro-5-diazo-10,11-dihydro-5H-dibenzo[a,d]cycloheptene with 2-vinyl-pyridine, reacting the resulting 3'-chloro-2-(2-pyridyl)-spiro[cyclopropane-1,5'-10',11'-dihydro-5'H - dibenzo[a,d]cycloheptene] with methyl iodide, and reducing the 2-(2-pyridyl)-3'-chloro - spiro[cyclopropane - 1,5'-10',11'-dihydro-5'H-dibenzo[a,d]cycloheptene] methiodide with lithium aluminum hydride;

3'-chloro-2-(1-methyl-4-pyridyl) - spiro[cyclopropane-1,5'-10',11'-dihydro-5'H-dibenzo[a,d]cycloheptene], prepared by reacting 3-chloro-5-diazo-10,11-dihydro-5H-dibenzo[a,d]cycloheptene with 4-vinyl-pyridine, reacting the resulting 3'-chloro-2-(4-pyridyl)-spiro[cyclopropane-1,5'-10',11' - dihydro - 5'H - dibenzo[a,d]cycloheptene] with methyl iodide, and reducing the 3'-chloro-2-(4-pyridyl)-spiro[cyclopropane-1,5'-10',11' - dihydro - 5'H - dibenzo[a,d]cycloheptene] methiodide with lithium aluminum hydride;

3'-chloro-2-(1-methyl-2-piperidylmethyl) - spiro[cyclopropane-1,5'-10',11'-dihydro-5'H - dibenzo[a,d]cycloheptene], prepared by a reacting the 3-chloro-5-diazo-10,11-dihydro-5H-dibenzo[a,d]cycloheptene with 2 - allyl-pyridine, reacting the resulting 3'-chloro-2-(2-pyridylmethyl)-spiro[cyclopropane-1,5'-10',11'-dihydro-5'H - dibenzo[a,d]cycloheptene] with methyl iodide, and reducing the 3'-chloro-2-(2-pyridylmethyl) - spiro[cyclopropane - 1,5'-10',11'-dihydro-5'H - dibenzo[a,d]cycloheptene] methiodide with lithium aluminum hydride;

2-(1-methyl-4-pyridyl)-spiro[cyclopropane - 1,5'-5'H-dibenzo[a,d]cycloheptene], prepared by reacting 5-diazo-5H-dibenzo[a,d]cycloheptene with 4-vinyl-pyridine, reacting the resulting 2-(4-pyridyl)-spiro[cyclopropane-1,5'-5'H-dibenzo[a,d]cycloheptene] with methyl iodide, and reducing the 2-(4-pyridyl)-spiro[cyclopropane - 1,5'-5'H-dibenzo[a,d]cycloheptene]methiodide by treatment with lithium aluminum hydride; or any other analogous compound.

The diazo-compounds used as intermediates in the above procedures are prepared, for example, by reacting the corresponding oxo-compound or, preferably, thiono-compound with hydrazine hydrate and oxidizing the resulting hydrazono-compound with mercuric oxide, as previously described; they are also obtained by forming the oximes of the di-monocyclic hexacyclic aryl-ketones and treating these oximes with chloramine.

What is claimed is:
1. A member selected from the group consisting of a compound of the formula

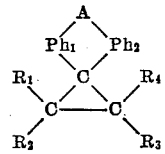

in which each of the groups $Ph_1$ and $Ph_2$ is a member selected from the group consisting of 1,2-phenylene, (lower alkyl)-1,2-phenylene, (lower alkoxy)-1,2-phenylene, (halogeno) - 1,2 - phenylene, (trifluoromethyl)-1,2-phenylene, (lower alkyl-mercapto)-1,2-phenylene and (lower alkanoyl)-1,2-phenylene, A is a member selected from the group consisting of a direct bond, thio, sulfonyl, oxy and 1,2-ethylene, each of $R_1$, $R_2$ and $R_3$ is hydrogen, $R_4$ is a member selected from the group consisting of N-$R_a$-piperidyl and (lower alkyl)-N-$R_a$-piperidyl, and $R_a$ is a member selected from the group consisting of hydrogen and lower alkyl, and a non-toxic pharmaceutically acceptable acid addition salt thereof.

2. A member selected from the group consisting of a compound of the formula

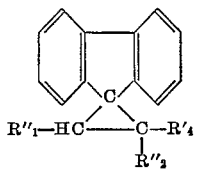

in which each of $R''_1$ and $R''_2$ is hydrogen, $R'_4$ is N-$R'_a$-piperidyl and $R'_a$ is a member selected from the group consisting of hydrogen and lower alkyl, and a non-toxic pharmaceutically acceptable acid addition salt thereof.

3. A member selected from the group consisting of a compound of the formula

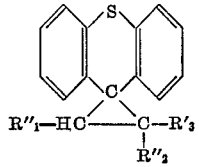

in which each of $R''_1$ and $R''_2$ is hydrogen, $R'_4$ is N-$R'_a$-piperidyl and $R'_a$ is a member selected from the group consisting of hydrogen and lower alkyl, and a non-toxic pharmaceutically acceptable acid addition salt thereof.

4. A member selected from the group consisting of a compound of formula

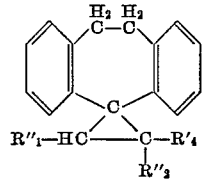

in which each of $R''_1$ and $R''_2$ is hydrogen, $R'_4$ is N-$R'_a$-piperidyl and $R'_a$ is a member selected from the group consisting of hydrogen and lower alkyl, and a non-toxic pharmaceutically acceptable acid addition salt thereof.

5. A member selected from the group consisting of 2-(4-piperidyl)-spiro[cyclopropane - 1,9' - fluorene], and a non-toxic pharmaceutically acceptable acid addition salt thereof.

6. A member selected from the group consisting of 2-(1-methyl-2-piperidyl) - spiro[cyclopropane - 1,9' - fluorene], and a non-toxic pharmaceutically acceptable acid addition salt thereof.

References Cited

UNITED STATES PATENTS

| | | | |
|---|---|---|---|
| 2,404,219 | 7/1946 | Cusic | 260—293 |
| 2,647,896 | 8/1953 | Stauffer et al. | 260—293 |
| 2,985,660 | 5/1961 | Judd et al. | 260—293 |
| 3,055,888 | 9/1962 | Renz et al. | 260—293.44 |
| 3,126,411 | 3/1964 | Rey-Bellet et al. | 260—294.7 |

FOREIGN PATENTS

| | | |
|---|---|---|
| 872,943 | 7/1961 | Great Britain. |
| 948,730 | 2/1964 | Great Britain. |

WALTER A. MODANCE, *Primary Examiner.*

A. D. SPEVACK, *Assistant Examiner.*

UNITED STATES PATENT OFFICE

CERTIFICATE OF CORRECTION

Patent No. 3,340,268 September 5, 1967

Renat Herbert Mizzoni

It is hereby certified that error appears in the above numbered patent requiring correction and that the said Letters Patent should read as corrected below.

Column 18, lines 42 to 49, for the lower right-hand portion of the formula reading "$R'_3$" read -- $R'_4$ --.

Signed and sealed this 21st day of January 1969.

(SEAL)
Attest:

Edward M. Fletcher, Jr.
Attesting Officer

EDWARD J. BRENNER
Commissioner of Patents